US012745746B2

(12) United States Patent
Cai et al.

(10) Patent No.: US 12,745,746 B2
(45) Date of Patent: Sep. 29, 2026

(54) LITTER DEVICE

(71) Applicant: GenHigh Tech Co., Limited, Shenzhen (CN)

(72) Inventors: Linfeng Cai, Shenzhen (CN); Yu Tang, Shenzhen (CN); Minxiang Cheng, Shenzhen (CN); Chuchu He, Shenzhen (CN); Deyong Lu, Shenzhen (CN)

(73) Assignee: GenHigh Tech Co., Limited, Shenzhen (CN)

( * ) Notice: Subject to any disclaimer, the term of this patent is extended or adjusted under 35 U.S.C. 154(b) by 133 days.

(21) Appl. No.: 18/670,786

(22) Filed: May 22, 2024

(65) Prior Publication Data

US 2024/0397904 A1 Dec. 5, 2024

(30) Foreign Application Priority Data

Jun. 1, 2023 (CN) ......................... 202310647751.1
Jun. 1, 2023 (CN) ......................... 202310648850.1
Jun. 1, 2023 (CN) ......................... 202321382826.X
Jun. 1, 2023 (CN) ......................... 202321386088.6

(51) Int. Cl.
*A01K 1/01* (2006.01)

(52) U.S. Cl.
CPC .................................. *A01K 1/0114* (2013.01)

(58) Field of Classification Search
CPC ..... A01K 1/0114; A01K 1/0107; A01K 1/011
See application file for complete search history.

(56) References Cited

U.S. PATENT DOCUMENTS 6,126,015 A * 10/2000 Haymaker ................ B07B 1/28 209/362
11,523,586 B2 * 12/2022 Baxter ................. A01K 1/0114
12,250,920 B2 * 3/2025 Zhang .................. A01K 1/0114
2011/0088630 A1 * 4/2011 Krotts .................. A01K 1/0114 119/166
2011/0214614 A1 * 9/2011 Sharp ................... A01K 1/0107 119/166
2020/0060221 A1 * 2/2020 Fan ...................... A01K 1/0114
2023/0247967 A1 * 8/2023 Ma ............................ B07B 1/24 119/166

FOREIGN PATENT DOCUMENTS

CN 215774797 U 2/2022
CN 217694773 U 11/2022
CN 218184576 U 1/2023
CN 219019872 U 5/2023

* cited by examiner

*Primary Examiner* — Yvonne R Abbott-Lewis
(74) *Attorney, Agent, or Firm* — Yuhao Liang

(57) ABSTRACT

The present disclosure provides a litter device, which comprises: a base having a concave groove; at least one support arm arranged on the base; a shell having a chamber and partially accommodated in the concave groove, the shell is rotatably connected to the support arm and rotated around an axis relatively to the support arm; a container arranged under the chamber, and having a collection cavity configured for collecting waste; wherein the chamber having an opening to allow pets to enter into, the shell is in shape of arc and having a center, the shell having an upper end and a lower end in the direction perpendicular to the axis, an angle between connection line of the upper end and the center and connection line of the lower end and the center is between 120-180 degrees.

19 Claims, 18 Drawing Sheets

LITTER DEVICE

CROSS-REFERENCE TO RELATED APPLICATION

The present application claims foreign priorities of Chinese Patent Application No. 202310648850.1, filed on Jun. 1, 2023, Chinese Patent Application No. 202310647751.1, filed on Jun. 1, 2023, Chinese Patent Application No. 202321386088.6, filed on Jun. 1, 2023, and Chinese Patent Application No. 202321382826.X, filed on Jun. 1, 2023, the entire contents of which are hereby incorporated by reference.

TECHNICAL FIELD

The present disclosure generally relates to a device for pets, and more particularly to a litter device.

BACKGROUND

Litter device may provide a means for consumer to effectively automatically clean up waste produced by pets, such as cat. The litter device may be advantageous in automatically removing waste contents from litter. Automatically and efficiently cleaning wasted litter has become an important point in the development of the litter device.

The development of the litter device may include the design of chamber for accommodating pets, design of assembly between parts, design of chamber drive, and the design of structures that can be transported easily. It is necessary to development a litter device with high comprehensive efficiency.

SUMMARY

Under the background as aforementioned, the present disclosure provides a litter device.

In a first aspect of the present disclosure, a litter device is provided, the litter device includes: a base having a concave groove; at least one support arm arranged on the base; a shell having a chamber and partially accommodated in the concave groove, the shell is rotatably connected to the support arm and rotated around an axis relatively to the support arm; and a container arranged under the chamber, and having a collection cavity configured for collecting waste; wherein the chamber having an opening to allow pets to enter into, the shell is in shape of arc and having a center, the shell having an upper end and a lower end in the direction perpendicular to the axis, an angle between connection line of the upper end and the center and connection line of the lower end and the center is between 120-180 degrees.

In a second aspect of the present disclosure, a litter device includes: a base having a concave groove; at least one support arm arranged on the base; a shell having a chamber and partially accommodated in the concave groove, the shell is rotatably connected to the support arm and rotated around an axis relatively to the support arm, the chamber having an opening to allow pets to enter into;

- a container arranged under the chamber, and having a collection cavity configured for collecting waste;
- wherein in the direction perpendicular to the opening of the shell, the ration between the area defined by the outline of the inner edge of the opening of the shell and the maximum area defined by the outer contour line B of the shell 30 is greater than 0.9.

In a third aspect of the present disclosure, a litter device includes: a base having a concave groove; at least one support arm arranged on the base; a shell having a chamber and partially accommodated in the concave groove, the shell is rotatably connected to the support arm and rotated around an axis relatively to the support arm, the chamber having an opening to allow pets to enter into;

- a container arranged under the chamber, and having a collection cavity configured for collecting waste; and the litter device further comprises a baffle and a filter element, one end of the baffle is mounted on the shell, the filter element is connected to another end of the baffle, the chamber is divided into storage space and separation space by the baffle and the filter element; the end of the baffle connected to the filter element is extended from the end of baffle mounted on the shell in a direction away from inner wall of the shell.

BRIEF DESCRIPTION OF THE DRAWINGS

In order to illustrate the technical solutions in the embodiments of the present disclosure more clearly, the drawings required to be used in the description of the embodiments will be briefly described below. It is obvious that the drawings in the following description are only some embodiments of the present disclosure. For one of ordinary skill in the art, other drawings may also be obtained according to these drawings without paying any creative effort.

DETAILED DESCRIPTION

Figure 1:
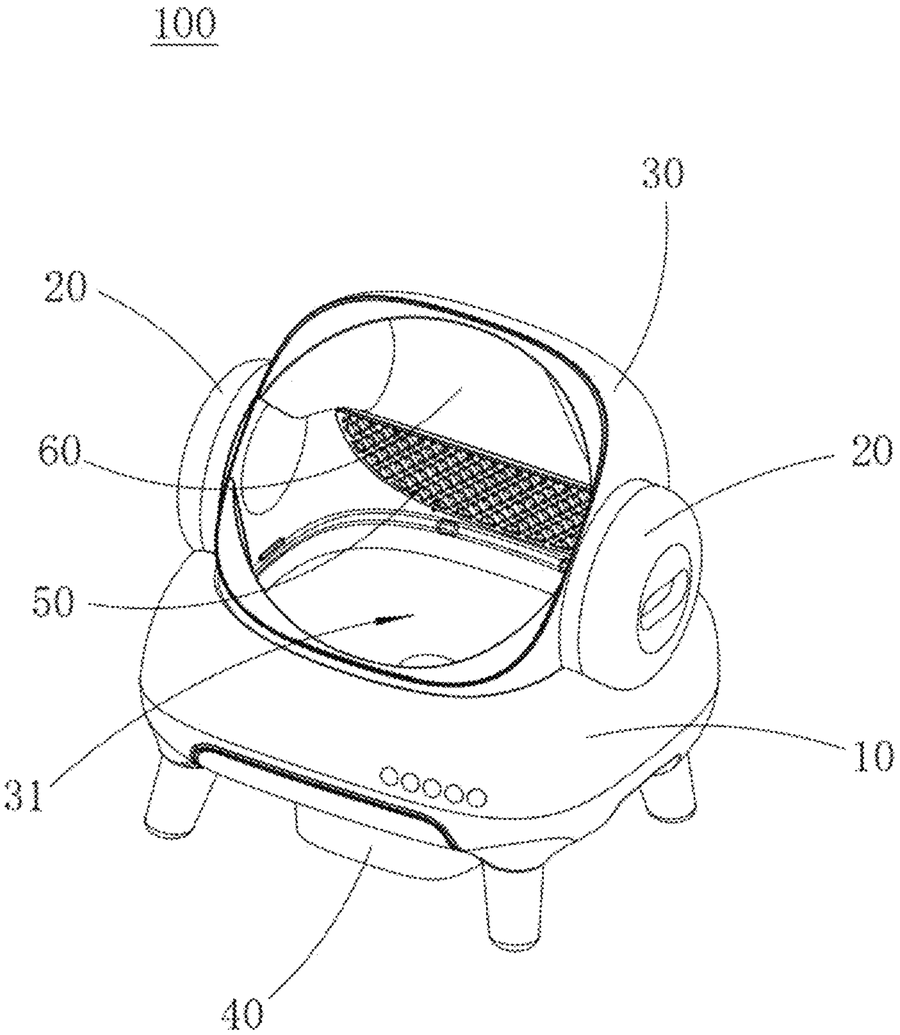
FIG. 1 is a schematic diagram of a structure of a litter device according to an embodiment of the present disclosure.

Technical solutions of the present disclosure will be described in detail with reference to the drawings, in which the same numbers refer to the same or similar elements unless otherwise specified. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Embodiments of the present disclosure shown in the drawings will be described in detail below. When describing the accompanying drawings, unless otherwise noted, the same reference number in different drawings indicate the same or similar elements. The embodiments described below do not represent all of the possible embodiments of the present disclosure. Instead, the embodiments described below are only some devices and methods that are consistent with various aspects of invention defined by the claims.

Figure 2:
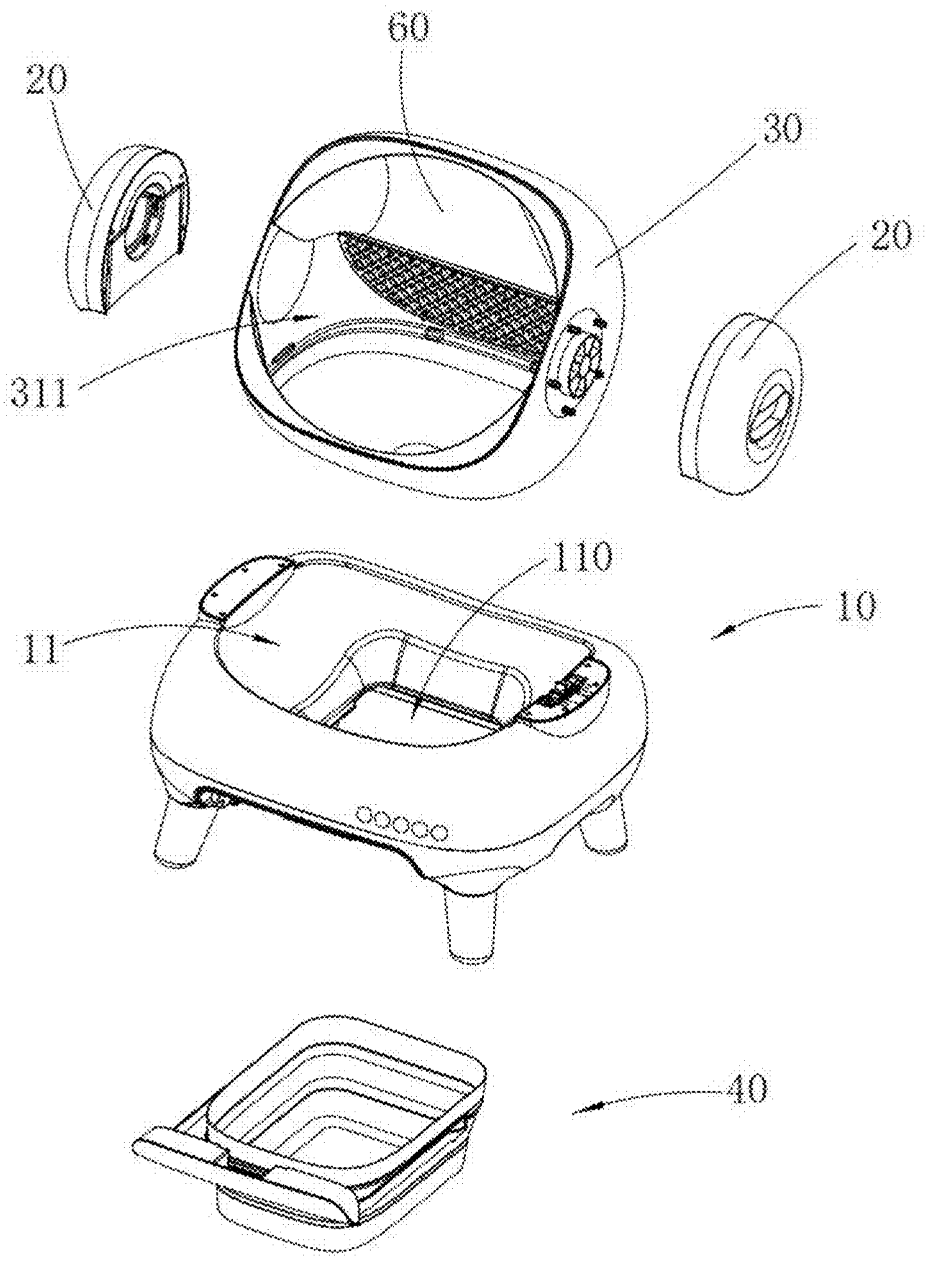
FIG. 2 is a schematic exploded diagram of the litter device shown in FIG. 1.
Figure 3:
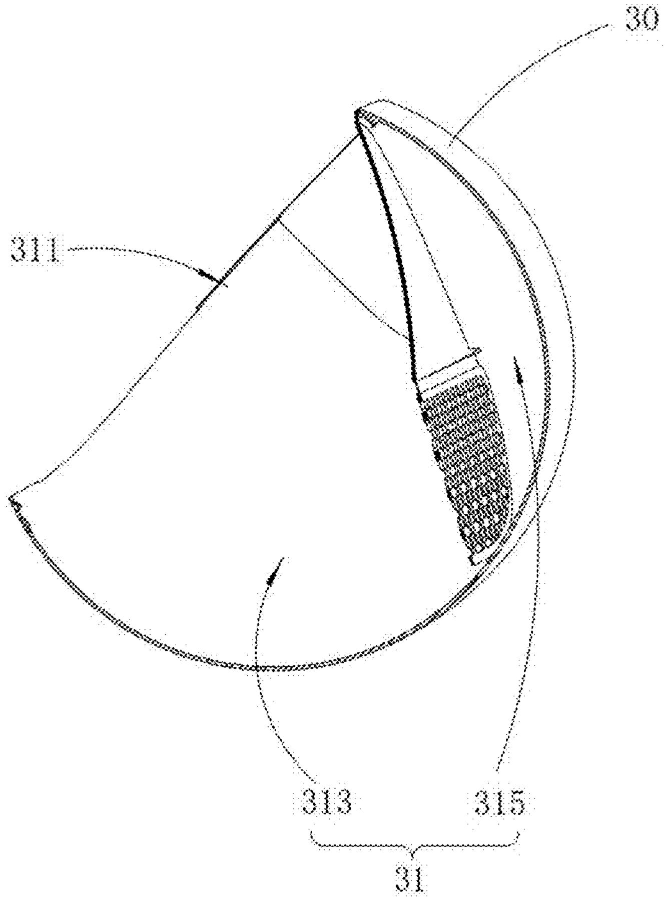
FIG. 3 is a schematic diagram of a cross-section of the shell of the litter device shown in FIG. 2.

Referring to the FIGS. 1-3, an embodiment of the present disclosure provides a litter device 100, which may include a base 10, a support arm 20, a shell 30. The base 10 can be placed on the ground to indirectly support the shell 30. The base 10 can have a concave groove 11, which is arranged on the side away from the ground. The support arm 20 can be mounted on the shell 30 and arranged at the edge of the concave groove 11. The shell 30 can be rotatably connected to the support arm 20 and partially accommodated in the concave groove 11. The shell 30 can have a chamber 31 to accommodate pet and litter, and the chamber 31 can have an opening 311 to allow the pet to enter into the chamber 31 and excrete waste.

The litter device 100 can also include a container 40 configured for collecting waste. The bottom of the concave groove 11 can have an outlet 110, the container 40 can be arranged at the outlet 110 corresponding to the shell 30. In one embodiment, the container 40 can be arranged under the shell 30 and detachably suspended from the base 10.

The litter device 100 can also include a filter element 50 arranged in the chamber 31, which is configured to distinguish clean litter and dirty litter. The filter element 50 can be provided with a plurality of filter holes, the clean litter can be passed through the filter element 50, the dirty litter can not be passed through the filter element 50 because of the size of the dirty litter is greater than the size of the filter holes. It should be noted, the dirty litter is mixture of waste of pet and clean litter.

In one embodiment, the litter device 100 can include a baffle 60 arranged in the chamber 31. The baffle 60 can be connected to the filter element 50. The chamber 31 can be divided into storage space 313 and separation space 315 by the baffle 60 and the filter element 50. The baffle 60 can be generally a curved plate, one end of the baffle 60 can be mounted on the shell 30, and another end of the baffle 60 can be extended in a direction away from the inner wall of the shell 30. The filter element 50 can be connected to another end of the baffle 60 away from the opening 311 The filter element 50, the baffle 60 and inner wall of the shell 30 can together define the separation space.

In one embodiment, the litter device 100 can have two support arms 20, the two support arms 20 can be arranged on the edge of the groove 11 respectively and can be positioned opposite each other, which can be supported the shell 30 together. A drive unit can be arranged in one support arm 20 to drive the shell 30 to rotate relative to the support arm 20.

Figure 4A:
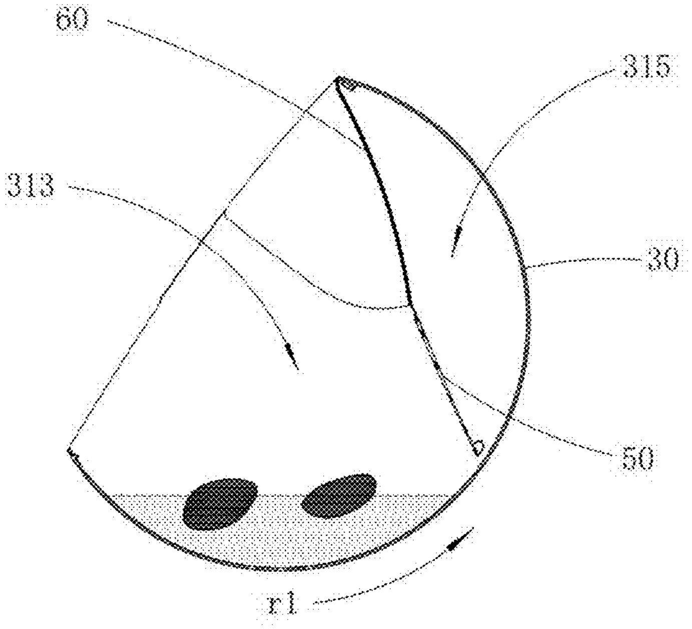
FIGS. 4A-4D are schematic diagrams of the shell being driven to separate the dirty litter from the clean litter.
Figure 4B:
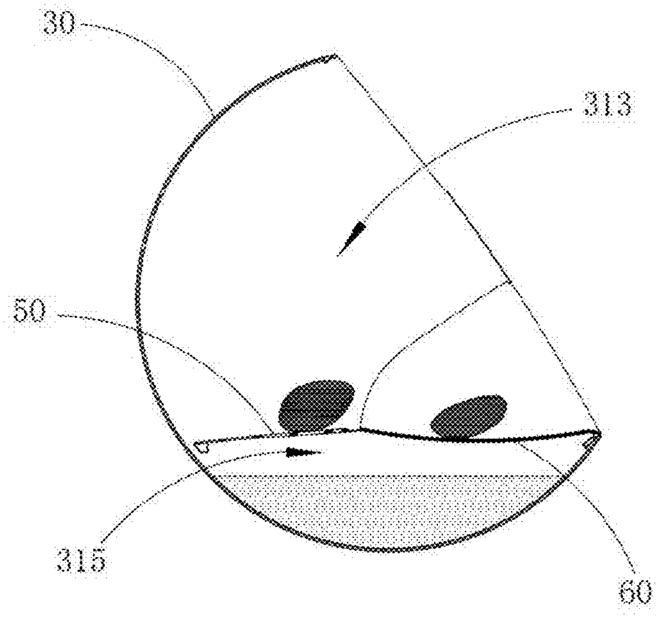
Figure 4C:
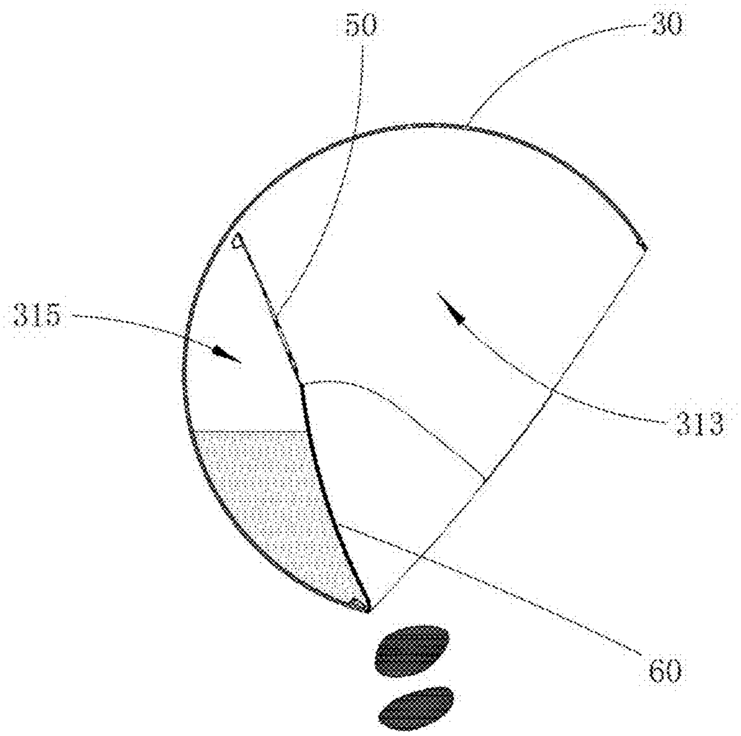
Figure 4D:
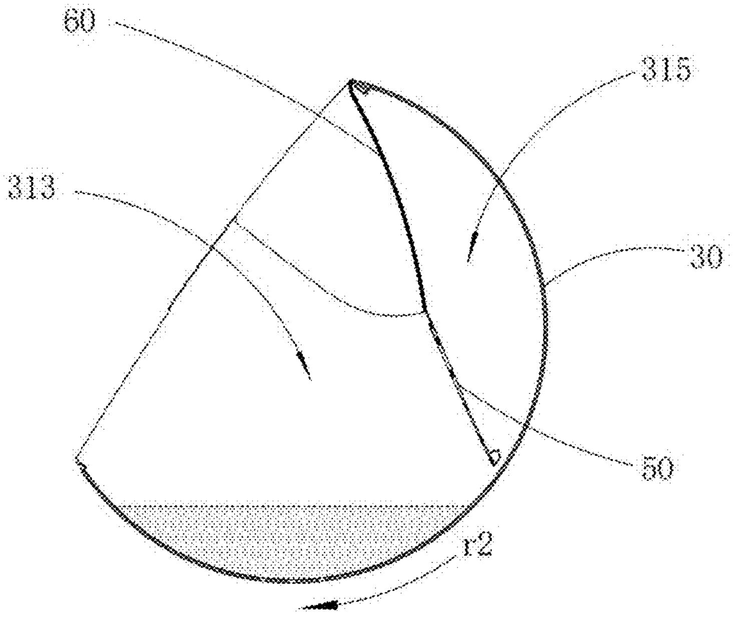

Referring to the FIGS. 4A-4D, which show schematic diagrams of the shell 30 being driven to separate the dirty litter from the clean litter. FIG. 4A shows the initial state of the shell 30, wherein there is a mixture of dirty litter and clean litter in the storage space 313. When the shell 30 is driven to rotate in a first direction r1 as shown in FIGS. 4A-4B, the clean litter can be passed through the filter element 50 and entered into the separation space 315 under the influence of gravity. The dirty litter can be blocked by the filter element 50 and be still in the storage space 313. When the shell 30 is continues driven to rotate in the first direction r1 as shown in FIG. 4C, the dirty litter can be poured out of the shell 30 from the storage space 313 and dumped into the waste container 40, the clean litter can be still stored in the separation space 315. When the dirty litter is poured out of the shell 30, the shell 30 can be driven to rotate in a second direction r2 as shown in FIG. 4D, the clean litter can be returned from the separation space 315 to the storage space 313, and the shell 30 can be rotated to the initial state to reuse for pets. Wherein, the first direction r1 refers to the clockwise direction in FIG. 4A, the second direction r2 refers to the counterclockwise direction in FIG. 4D.

Under certain conditions, it is necessary to clean out all the used litter, the shell 30 can be directly driven to rotate in the second direction r2 when the shell is in the initial state, all litter can be poured out of the shell 30 and dumped into the waste container 40, it is convenient for user to place new litter to the storage space 313 of the chamber 31.

Figure 5A:
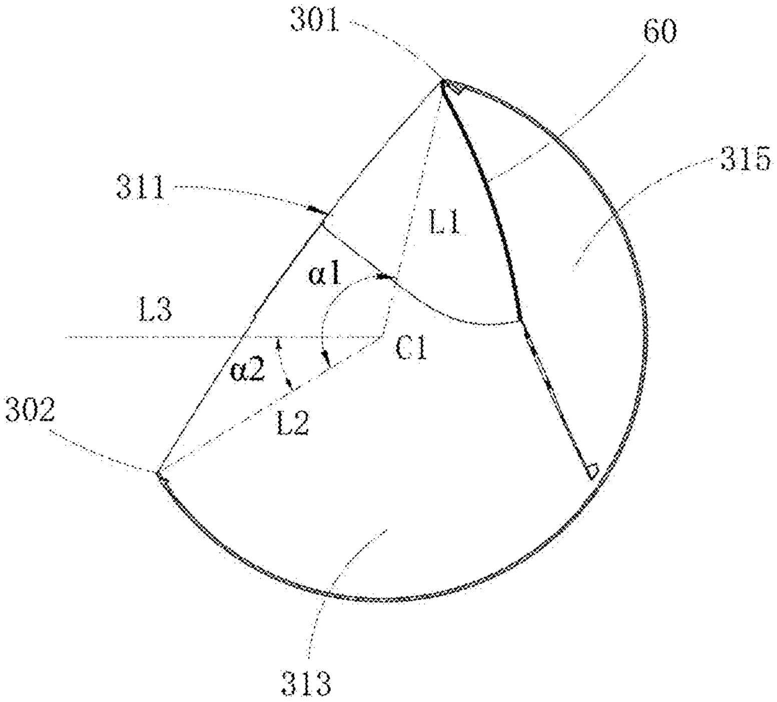
FIG. 5A is a cross-section diagram of the shell in the direction perpendicular to the rotation axis of the shell.

Referring to the FIG. 5A, in the direction perpendicular to the rotation axis of the shell 30, the outline of the cross-section of the shell 30 is substantially in the shape of an arc. The shell 30 has an upper end 301 of the opening 311 connected with the baffle 60, and a lower end 302 of the opening 311 away from the upper end 301. On the plane perpendicular to the rotation axis of shell 30, the connection line between the center C1 of the shell 30 and the upper end 301 is L1, the connection line between the center C1 of the shell 30 and the lower end 302 is L2, the angle $\alpha$1 between the connection line L1 and the connection line L2 towards to the opening 311 of the shell 30 can be between 120-180 degrees. If the angle $\alpha$1 is less than 120 degrees, the opening 311 of the shell 30 is small, so that larger pets cannot enter the litter device 100.

In some embodiments, the angle $\alpha$1 can be less than 150 degrees. If the Angle $\alpha$1 is greater than 150 degrees, the opening 311 of the shell 30 is large, so that the storage capacity of the shell 30 is reduced, which is not conducive to collect waste.

In some embodiments, on the plane perpendicular to the rotation axis of shell 30, the horizontal line is L3 in the initial state of the litter device, the angle α2 between the connection line L2 and horizontal line L3 can be between 20 and 40 degrees, which allows the storage space 313 to have roughly the same capacity as the separation space 315, and helps to separate clean litter and dirty litter. If the angle α2 is less than 20 degrees, the height difference between bottom of the chamber 31 and the lower end 302 is larger, which results in a deeper depth of the chamber 31, and increases the difficulty of access to the chamber 31. If the angle α2 is greater than 40 degrees, the storage capacity of the shell 30 will be reduced, which is not conducive to collect waste. In one embodiment, the angle can be 30 degrees.

If the storage capacity of the separation space 315 is significantly greater than the storage capacity of the storage space 313, the separated clean litter only occupies a small amount space of the separation space 315, which unreasonably increases the volume of the shell 30. If the storage capacity of the separation space 315 is significantly less than the storage capacity of the storage space 313, the separation space 315 cannot fully accommodate the separated clean litter, and part of the clean litter may be poured out with the dirty litter, which will waste the clean litter.

Figure 5B:
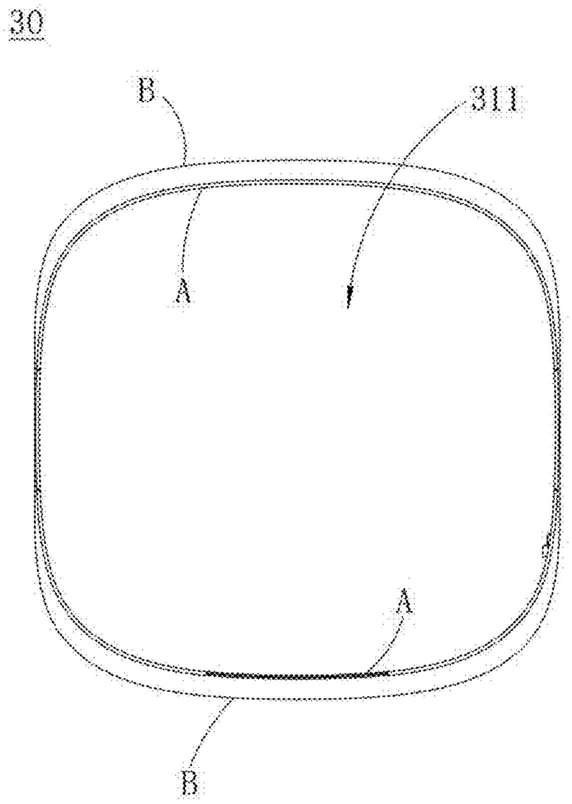
FIG. 5B is schematic diagram of the shell in the direction perpendicular to the opening of the shell.

Referring to the FIG. 5B, in the direction perpendicular to the opening 311 of the shell 30, the opening 311 can be defined by the inner edge A of the shell 30, the ration between the area defined by the outline of the inner edge of the opening of the shell 30 and the maximum area defined by the outer contour line B of the shell 30 is greater than 0.9. In one embodiment, the ratio is less than 0.95.

Figure 6:
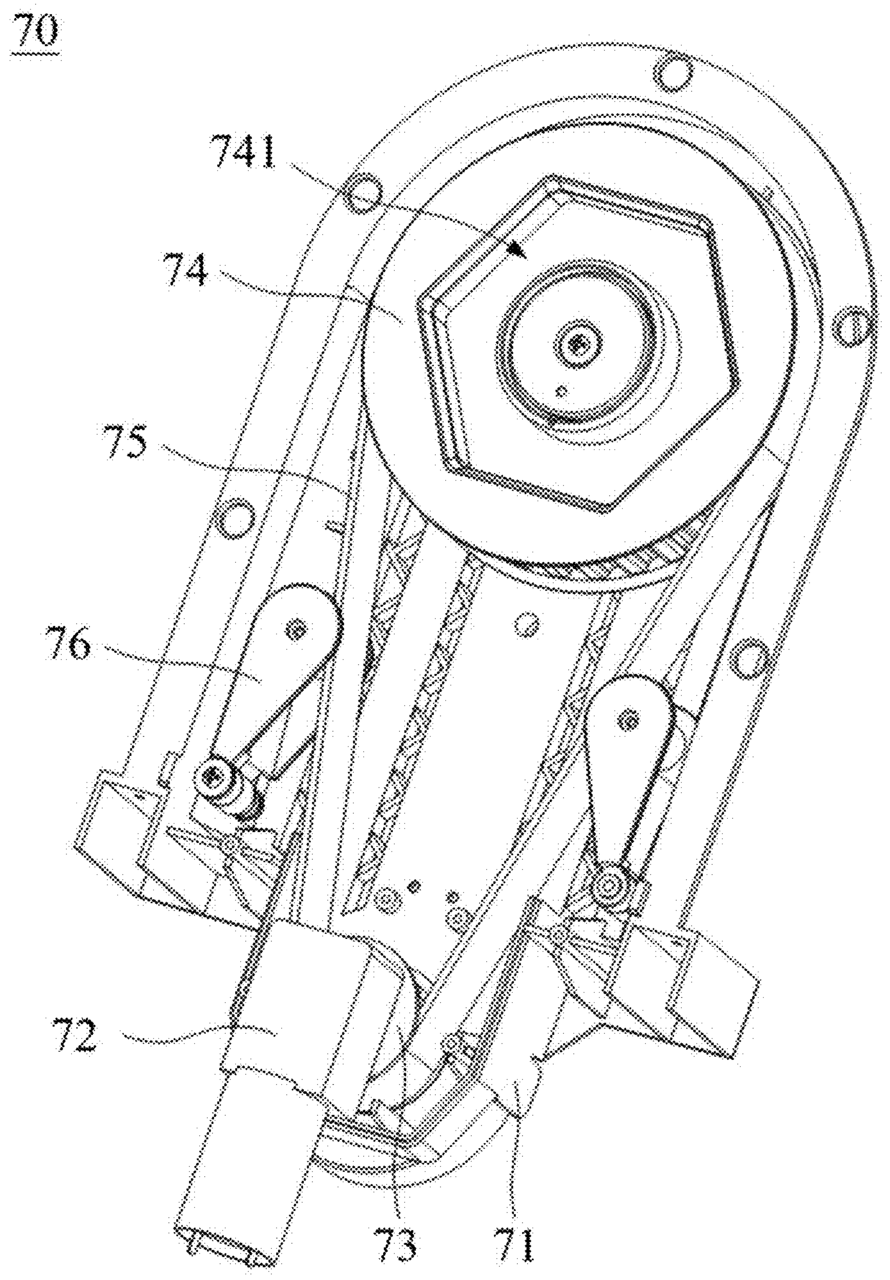
FIG. 6 is a schematic diagram of a structure of a drive unit according to an embodiment of the present disclosure.
Figure 7:
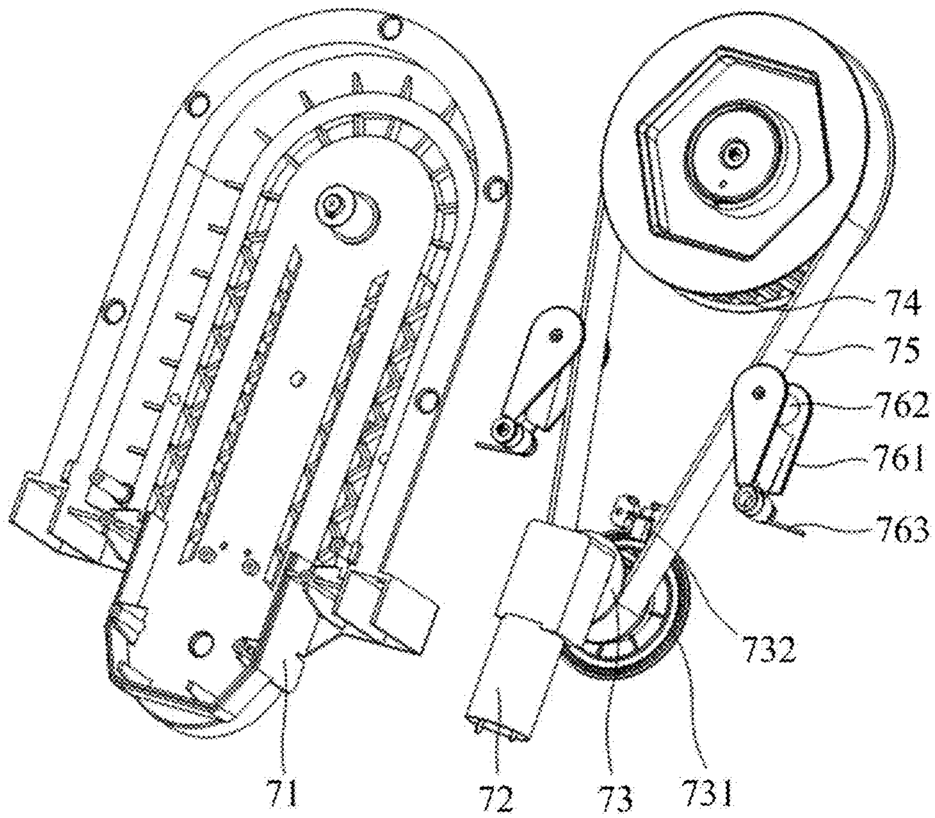
FIG. 7 a schematic exploded diagram of the drive unit shown in FIG. 6.
Figure 8:
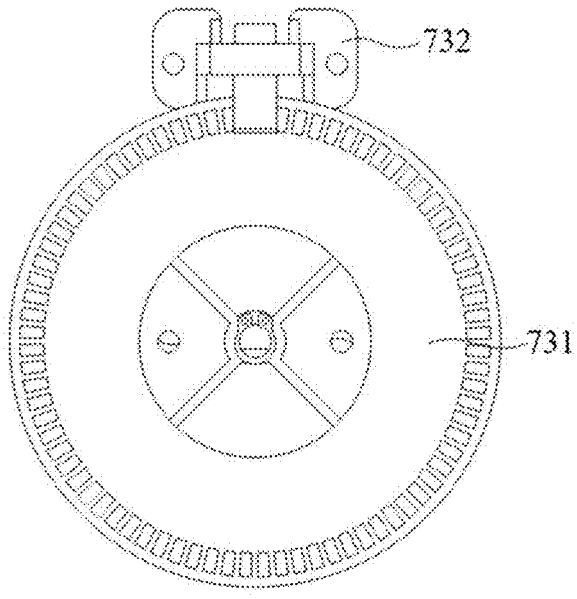
FIG. 8 is a schematic diagram of a structure of a dial and a photoelectric switch.

Referring to the FIGS. 6-8, in some embodiments, the number of the support arm 20 can be two, a drive unit 70 can be one support arm 20 which is configured to rotate the shell 30. The drive unit 70 can include a mounting plate 71, a motor 72, a driving wheel 73, a driven wheel 74 and a conveyor belt 75. The mounting plate 71 can be mounted on the base 10 and extended vertically away from the base 10. The driving wheel 73 can be arranged at the end of the mounting plate 71 close to the base 10, the driven wheel 74 can be arranged at another end of the mounting plate 71 away from the base 10. The conveyor belt 75 can be connected the driving wheel 73 and the driven wheel 74, the motor 72 can be connected to the driving wheel 73, the driven wheel 74 can be connected to the shell 30. The driving wheel 73 can be driven to rotate by the motor 72, and then the driven wheel 74 and the shell 30 can be driven to rotate by the driving wheel 73. The motor 72 can be installed on the base 10.

In order to make the shell 30 and the driven wheel 74 be rotated synchronously, the driven wheel 74 can be provided with a connect slot 741 on the side facing the shell 30, and the shell 30 can be locked in the connect slot 741. The cross-sectional shape of the connect slot 741 may be an elliptical shape, a polygonal shape, or other non-circular cross-section. In one embodiment, the cross-sectional shape of the connect slot 741 can be a regular hexagon, which make the stress generated by the transmission torque more uniformly distributed on the side wall of the connect slot 741.

When the conveyor belt 75 is in a tensioned state for a long time, the tension of the conveyor belt 75 can be reduced, which may cause the driven wheel 74 and the driving wheel 73 to rotate out of synchronization and cause slipping, the drive unit 70 cannot drive the shell 30 to rotate well. In order to adjust the tension of conveyor belt 75, a tension adjustment member 76 can be provided on the mounting plate 71. Specifically, the tension adjustment member 76 can include an adjustment body 761, an adjustment shaft 762 and a torsion spring 763, one end of the adjusting body 761 can be rotatably mounted on the mounting plate 71, the adjusting shaft 762 can be rotatably connected to the another end of the adjusting body 761, the opposite ends of the torsion spring 763 can be respectively in contact with the mounting plate 71 and the adjustment body 761. Generated torsional elastic deformation of the torsion spring 763 can press the adjustment shaft 762 against the conveyor belt 75.

In one embodiment, the number of the tension adjustment member 76 may be two, and the two tension adjustment members 76 can be respectively provided on opposite sides of the conveyor belt 75 in the transverse direction. Each tensioning adjustment member 76 can exert pressure on the conveyor belt 75 to tighten the conveyor belt 75. By arranging two tension adjustment members 76, the adjustment space for adjusting the tension of the conveyor belt 75 can be increased to ensure that the conveyor belt 75 continues to be in a tensioned state. When the conveyor belt 75 is relaxed, the user can push the adjustment shaft 762 to press against the conveyor belt 75, so that the conveyor belt 75 can be entered the tensioned state.

In some embodiments, in order to present the rotation status of the driving wheel 73, a dial 731 can be arranged on the side of the driving wheel 73 away from the shell 30, and a photoelectric switch 732 can be correspondingly provided on the mounting plate 71. A plurality of holes can be evenly distributed on the outer periphery of the dial 731, the number of tholes can be set according to the required accuracy. For example, if the required accuracy is 1 degree, the number of holes can be 360, and the angle between the connection line between two adjacent holes and the center of the dial 731 is 1 degree. The photoelectric switch 732 can emit and receive light beams. When the light beam emitted by the photoelectric switch 732 passes through the hole on the dial 731, and the light beam can be received by the photoelectric switch 732. Every time the dial 731 rotates by an angle between adjacent holes, the photoelectric switch 732 can be triggered. The photoelectric switch 732 can obtain the rotation direction and angle of the dial 731 by recording the number of triggers. Since the dial 731 rotates synchronously with the driving wheel 73 and the shell 30, the rotation angle of the dial 731 is the rotation angle of the shell 30. The working state of the litter device 100 can be obtained through the rotation angle of the shell 30, which facilitates debugging of the litter device 100. In addition, if user feedbacks that the rotation angle is too large or too small when cleaning the litter, the maintenance personnel can adjust the angle through the background to meet the user's needs, thus facilitating the later maintenance of the litter device 100.

Figure 9:
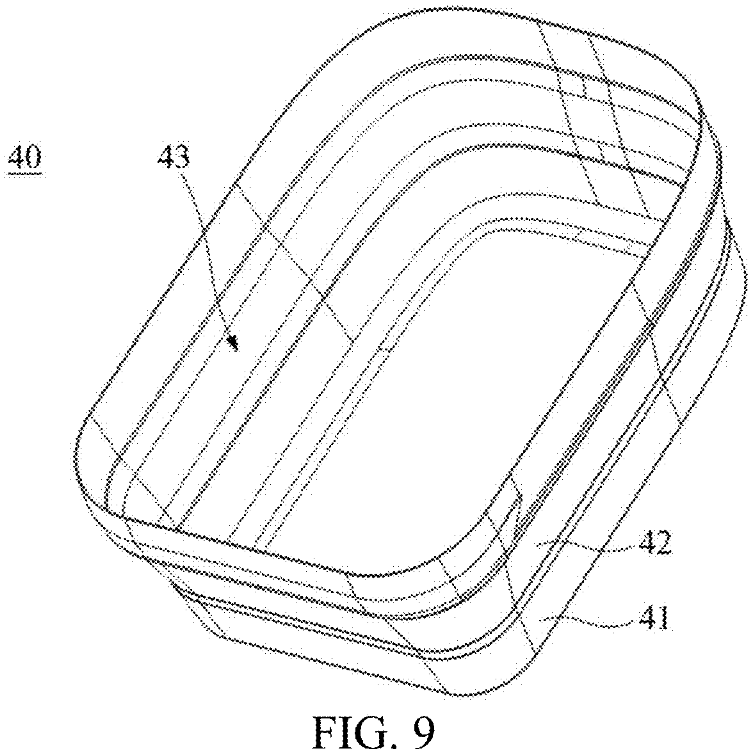
FIG. 9 is a schematic diagram of a structure of a container according to an embodiment of the present disclosure.
Figure 10:
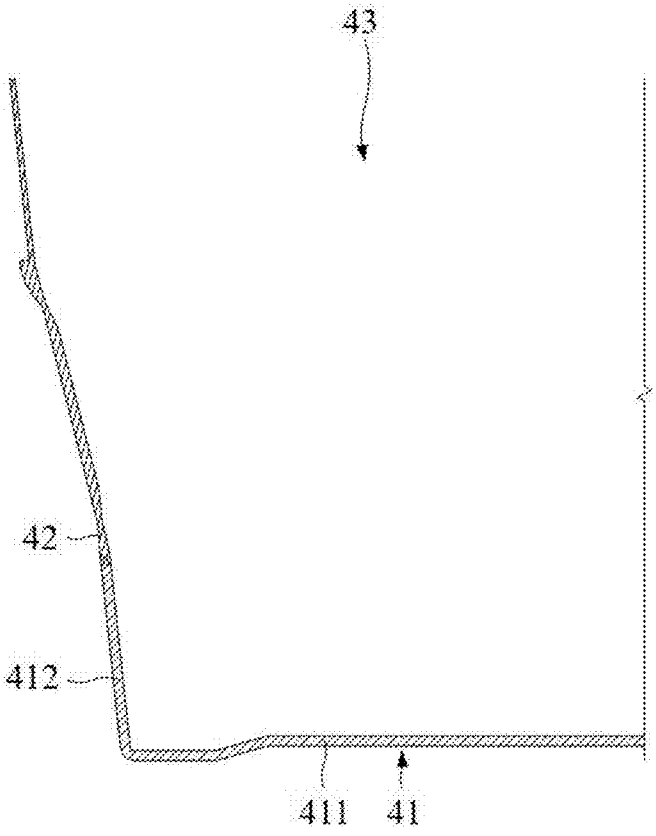
FIG. 10 is a cross-section diagram of the container according to an embodiment of the present disclosure.

Referring to FIGS. 9-10, an embodiment of the container 40 is provided, the container 40 can include a bottom housing 41 and a side housing 42. The side housing 42 can be connected to the bottom housing 41, and can be made of foldable material. The container 40 can have a first state and a second state, wherein the first state is the state in which the container is used in the litter device, the second state is the state in which the container 40 is transported. In the first state, a collection cavity 43 can be formed by the bottom housing 41 and the side housing 42, which is used to collect the waste and litter. Since the side housing 42 is made of foldable material, the side housing 42 in the first state can be compressed and folded towards to the bottom housing 41 to become the second state. The volume of the container 40 in the second state is smaller than the volume in the first state, the container 40 can be transported in the second state, which can reduce the transportation cost. The side housing 42 can be processed from a first material, the bottom housing 41 can be processed from a second material, the hardness of the second material is greater than the hardness of the first material.

In one embodiment, the hardness of the first material can be Shore A55~65, if the hardness of the first material is less than Shore A55, the container 40 will be greatly deformed when there is a lot of litter and/or litter collected in the collection cavity 43, which is not conducive to normal use; if the hardness of the second material is greater than Shore A65, it is difficult to fold the side wall 20, which is not conducive to the convenience of transportation. The first material can be one of silicone or natural rubber, which can be easily folded.

In one embodiment, the cross-sectional area of the opening of the collection cavity 43 can be larger than the cross-sectional area of the bottom housing 41. When the side housing 42 is compressed and folded towards to the bottom housing 41, the folded portion of the side housing 42 can be stored in the space defined between the inner wall of the opening of the collection cavity 43 and the outer wall of the bottom housing 41.

In one embodiment, in order to ensure good rigidity on the side of the collection cavity 43, the bottom housing 41 may include a bottom plate 411 and a side part 412, the side part 412 can be arranged around the outer periphery of the bottom plate 411 and connected to the side housing 42. Since the side part 412 with relatively high hardness is provided on the side of collection cavity 43, it can further ensure that the side of the collection cavity 43 cannot easily be deformed, so as to improve the overall rigidity of the container 40.

In one embodiment, in order to facilitate the removal of the container 40 from the litter device or to installation in the litter device, a push-pull part 44 can be provided on one side of the side housing 42 away from the bottom housing 41, and the push-pull part 44 can be connected to the side housing 42. The push-pull part 44 can have a relatively high hardness to ensure that it is not easily deformed during push-pull.

It is understood that the bottom housing 41 can only include the bottom plate 411 without the side part 412.

Figure 11:
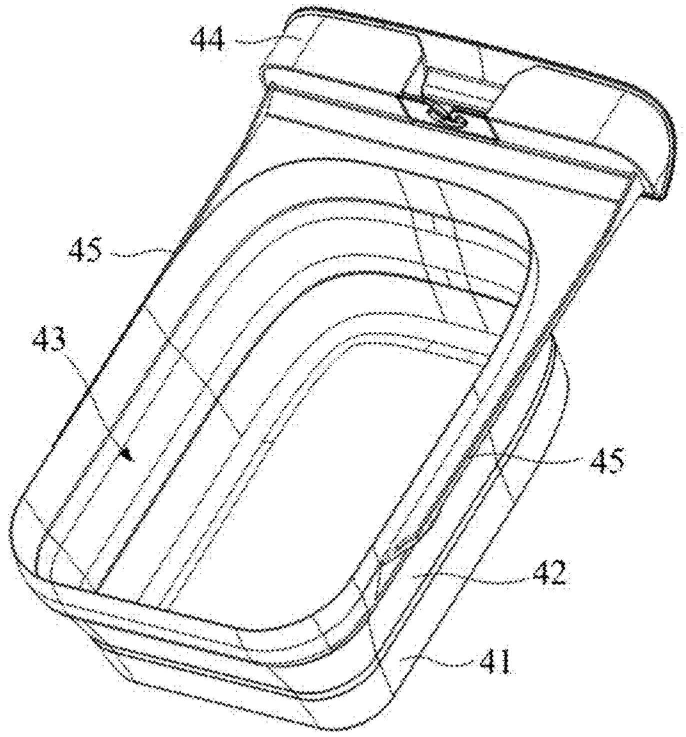
FIG. 11 is a schematic diagram of a structure of the container according to another embodiment of the present disclosure.
Figure 12:
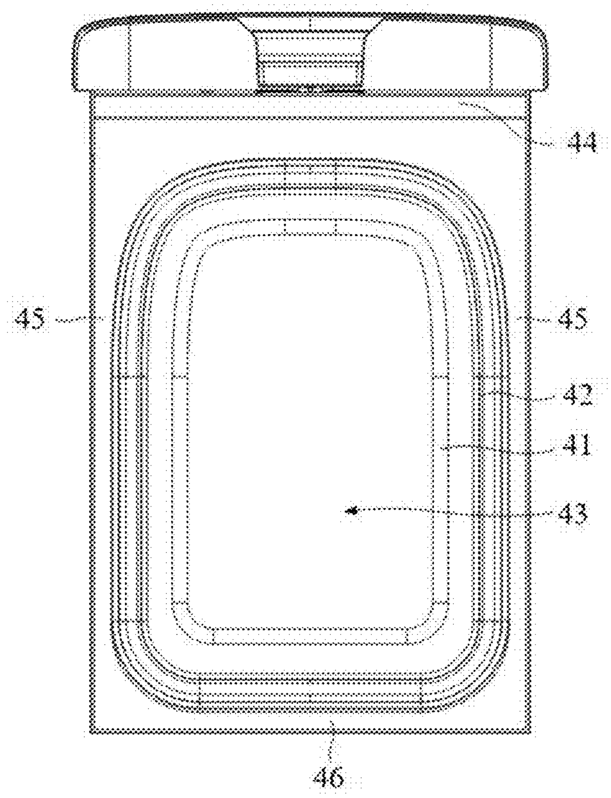
FIG. 12 is a schematic diagram of a structure of the container according to another embodiment of the present disclosure.
Figure 13:
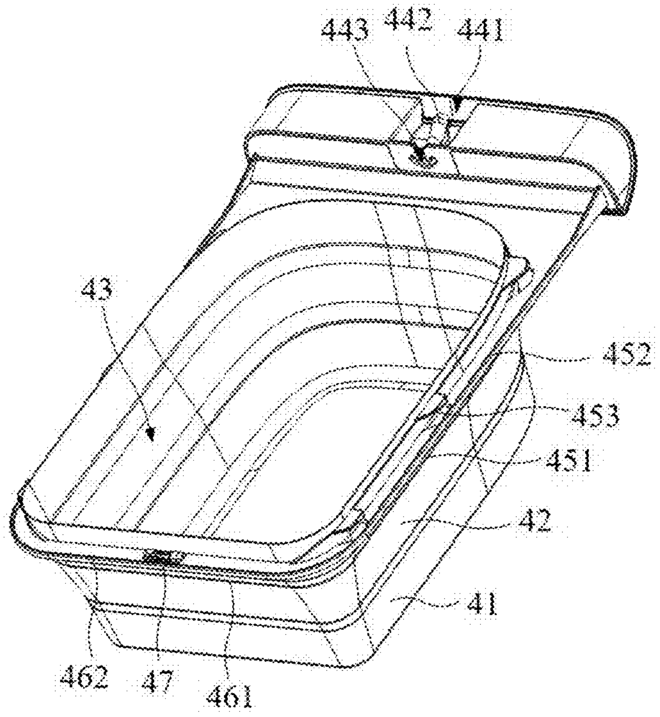
FIG. 13 is a schematic diagram of a structure of the container according to another embodiment of the present disclosure.
Figure 14:
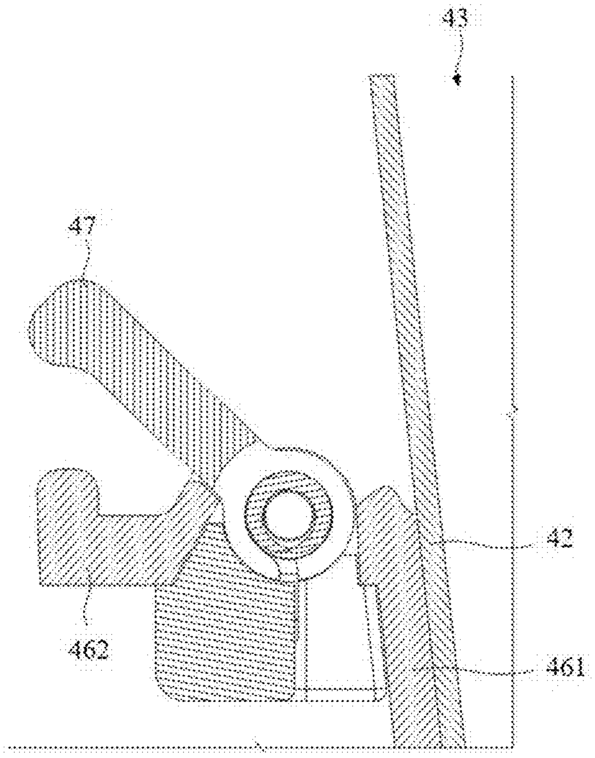
FIG. 14 is a schematic diagram of a first hook shown in FIG. 13.
Figure 15:
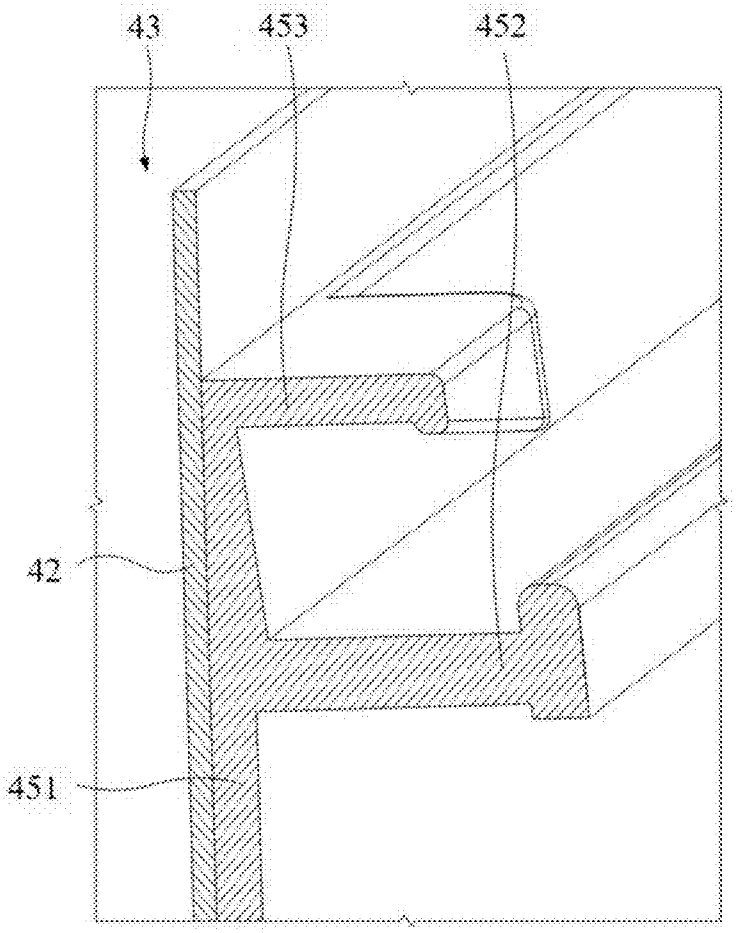
FIG. 15 is a schematic diagram of teeth shown in FIG. 13.
Figure 16:
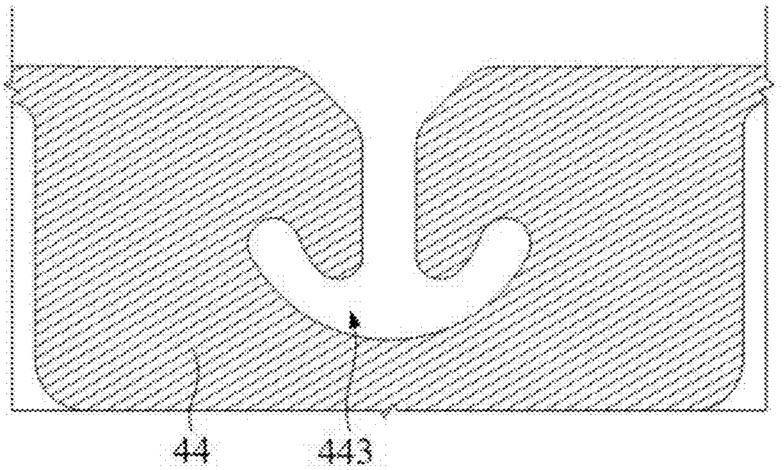
FIG. 16 is a schematic diagram of a drawstring hole shown in FIG. 13.

Referring to FIGS. 11-12, in one embodiment, in order to facilitate the assembly of the container 40 to the litter device, a first frame 45 can be provided on the outer side of the side housing 42 adjacent to the push-pull part 44. One end of the first frame 45 can be connected to the push-pull part 44, and the other end of the first frame 45 can be extended transversely along the side housing 42. The first frame 45 and the push-pull part 44 may be integrally formed. The first frame 45 and the push-pull part 44 can be semi-encircled around the outer periphery of the side housing 42. The first frame 45 can be used as a slide rail to slide on the litter device, thereby facilitating the pushing and pulling of the container 40.

In one embodiment, the container 40 can be provided with a second frame 46 on the side opposite the push-pull part 44 and connected to the side housing 42. The second frame 46 can be connected to the end of the first frame 45 as a whole. The first frame 45, the second frame 46 and the push-pull part 44 can be completely surrounded the outer periphery of the side housing 42, so as to improve the rigidity of the opening of the container 40.

Referring to FIGS. 13-16, the first frame 45 can include a first frame wall 451 and a first flange 452 protruding from the first frame wall 451. The first flange 452 can be connected to the side of the first frame wall 451 away from the side housing 42. The first flange 452 may be acted as a slide to guide the movement of the container 40 when the container 40 is assembled to the litter device.

The second frame 46 can include a second frame wall 461 and a second flange 462, the first frame wall 451 and the second frame wall 461 can be connected as a whole to surround the side housing 42, the second flange 462 can be connected to the side of the second frame wall 461 away from the side housing 42. The distance between the upper edge of the first frame wall 451 and the second frame wall 461 and the upper edge of the side housing 42 is greater than zero. Since the upper edge of the side housing 42 is made of a soft material, when the waste tray 100 is mounted on the litter device, the side housing 42 can be close to sealing structure, which can reduce the leakage of odor in the container.

A garbage bag can be installed in the collection cavity 43 for collecting waste to maintain the cleanliness of container 40. When the garbage bag is placed on the side housing 42, the opening edge of the garbage bag may be easily slide off the side housing 42. In one embodiment, a plurality of teeth 453 can be spaced on first frame wall 451, the teeth 453 can be arranged on the side of first flange 452 away from the bottom housing 41 and protruding from the side housing 42. The teeth 453 and the first flange 452 can be relatively spaced, a hanging position can be defined for hanging drawstring of the garbage bag to prevent the garbage bag from slipping and ensure that the garbage bag is opened. The teeth 453 may be provided with a slope at one end away from the push-pull part 44, it is only need to pull the drawstring at one end of the push-pull part 44 to slide out the teeth 453 along the slope to take out the garbage bag.

In one embodiment, a first hook 47 can be provided on the side of the second flange 462 away from the bottom housing 41, the first hook 47 and the second flange 462 can be rotatably connected through a torsion spring. When the garbage bag is set on the container 40, the first hook 47 can be tilted away from the push-pull part 44, drawstring of the garbage bag can be hung on the first hook 47 to prevent slipping and ensure that the garbage bag be opened. When the drawstring of the garbage bag is pulled, the first hook 47 can be turned over, and rotated towards to the push-pull part 44, so that the drawstring can be separated from the first hook 47. When the first hook 47 is turned over, the torsion spring can be driven to undergo elastic deformation, the elastic deformation of the torsion spring can be restored when the garbage bag is taken out, thereby the first hook 47 can be driven to reset.

In one embodiment, the push-pull part 44 can be provided with a drawstring storage cavity 441 configured for storing the drawstring of the garbage bag. A second hook 442 can be provided in the drawstring storage cavity 441, the drawstring of garbage bag away from the first hook 47 can be hung on the second hook 442. A drawstring hole 443 can be provided on the side wall of the drawstring storage cavity 441 close to the first hook 47, the drawstring hole 443 can have an opening on the side away from the bottom housing 41, the drawstring can be passed through the opening and entered into the drawstring hole 443 to facilitate hanging the drawstring on the second hook 442.

When it is necessary to take out the garbage bag, there is no need to pull out the container 40. User can pull the drawstring hanging on the second hook 442 diagonally upward, the first hook 47 can be turned over, and the drawstring can be separated from the first hook 47 and separated from the teeth 453.

The drawstring hole 443 can be a long and narrow arc-shaped groove, the opening of the arc-shaped groove can be faced the side away from the bottom housing 41, two ends of the arc-shaped groove can be extended to both sides where the first frame 45 located, two protrusions can be downwardly extended on both sides of the opening of the drawstring hole 443 to limit the drawstring in the drawstring hole 443.

Figure 17:
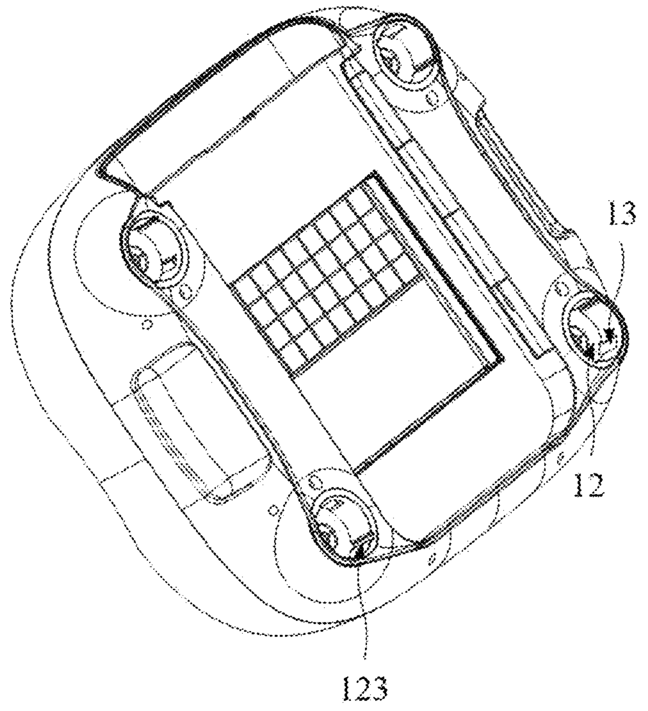
FIG. 17 is a schematic diagram of a base according to an embodiment of the present disclosure.
Figure 18:
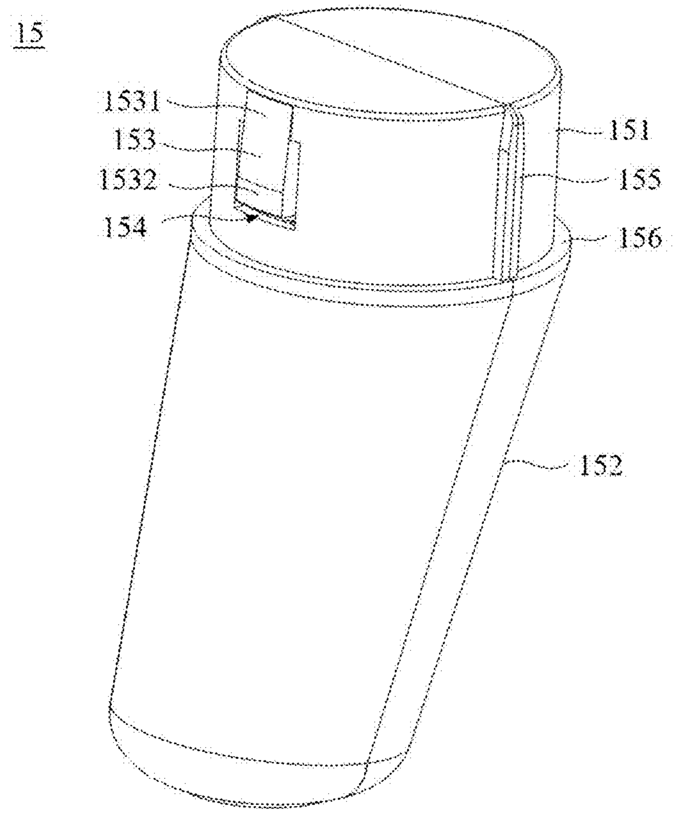
FIG. 18 is a schematic diagram of a support leg according to an embodiment of the present disclosure.
Figure 19:
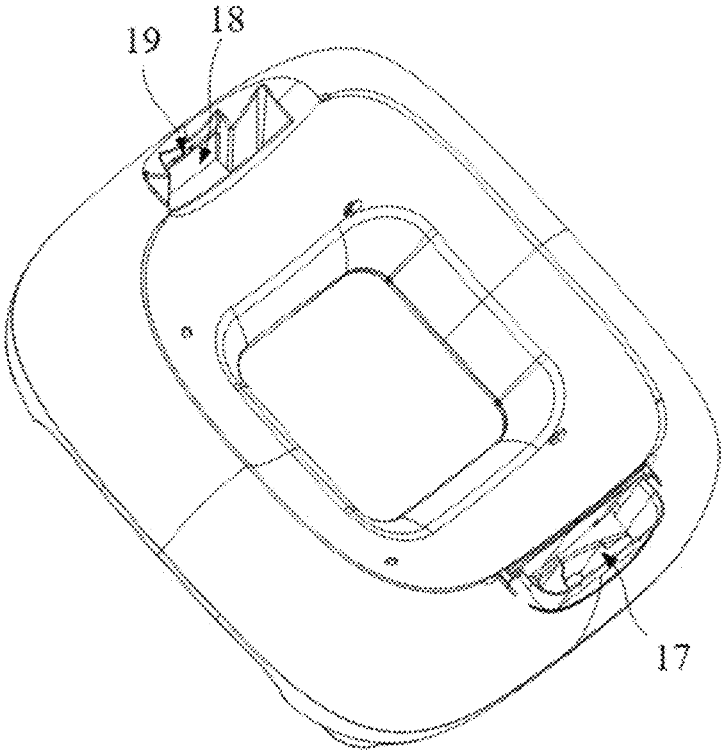
FIG. 19 is a structural diagram of an embodiment of the pedestal provided in this application.
Figure 20:
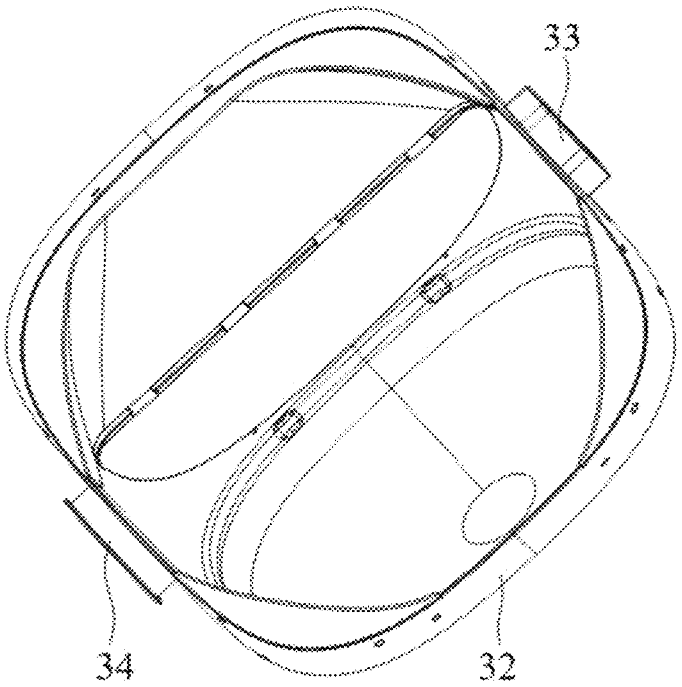
FIG. 20 is a structural diagram of an embodiment of sand silo provided in this application.
Figure 21:
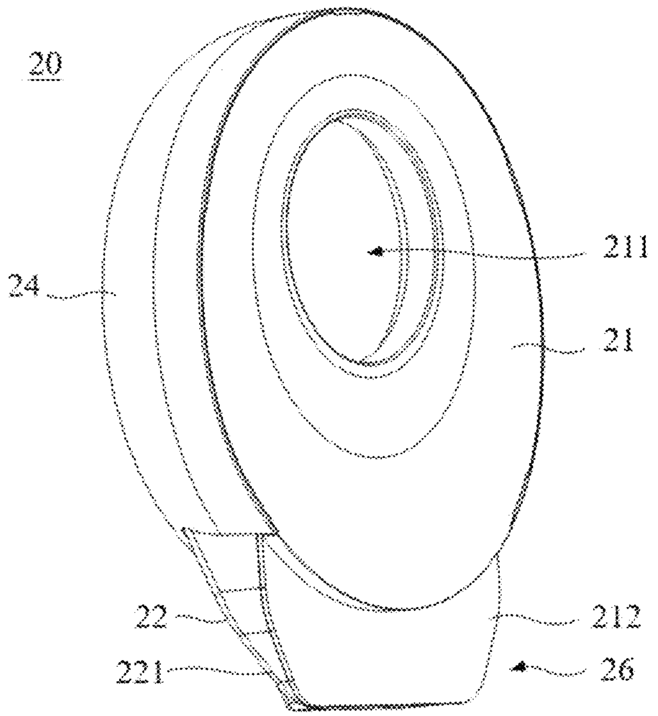
FIG. 21 is a structural diagram of the supporting arm-embodiment provided in this application along one perspective.
Figure 22:
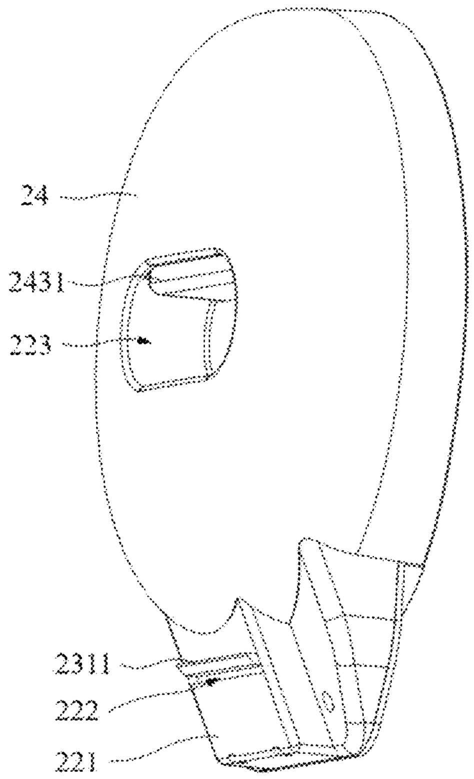
FIG. 22 is a structural diagram of an embodiment of the support arm provided in this application along another perspective.
Figure 23:
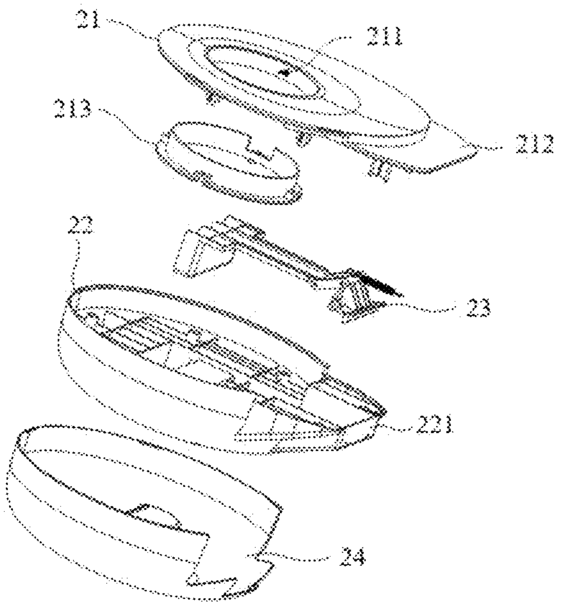
FIG. 23 is a schematic diagram of the decomposed structure of an embodiment of the support arm provided in this application.
Figure 24:
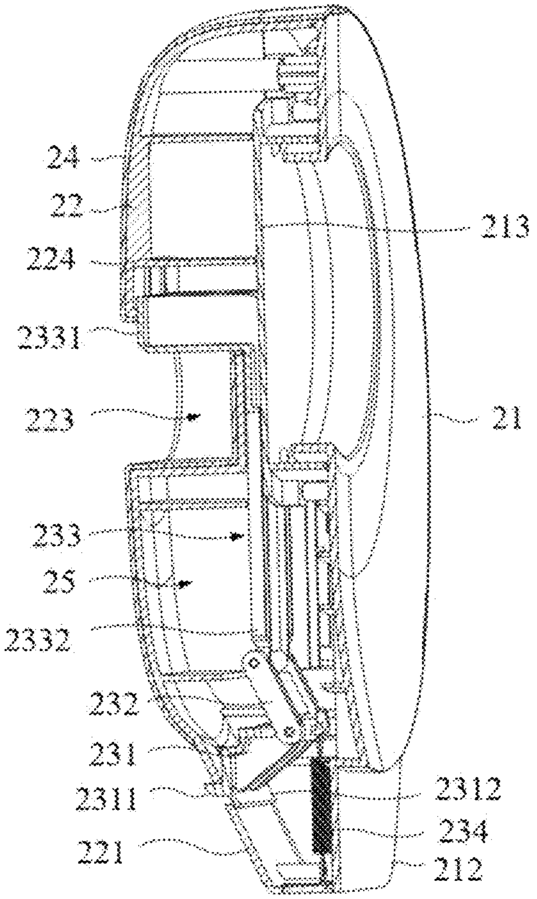
FIG. 24 is a schematic diagram of the profile structure of an embodiment of the support arm provided in this application along a perspective.
Figure 25:
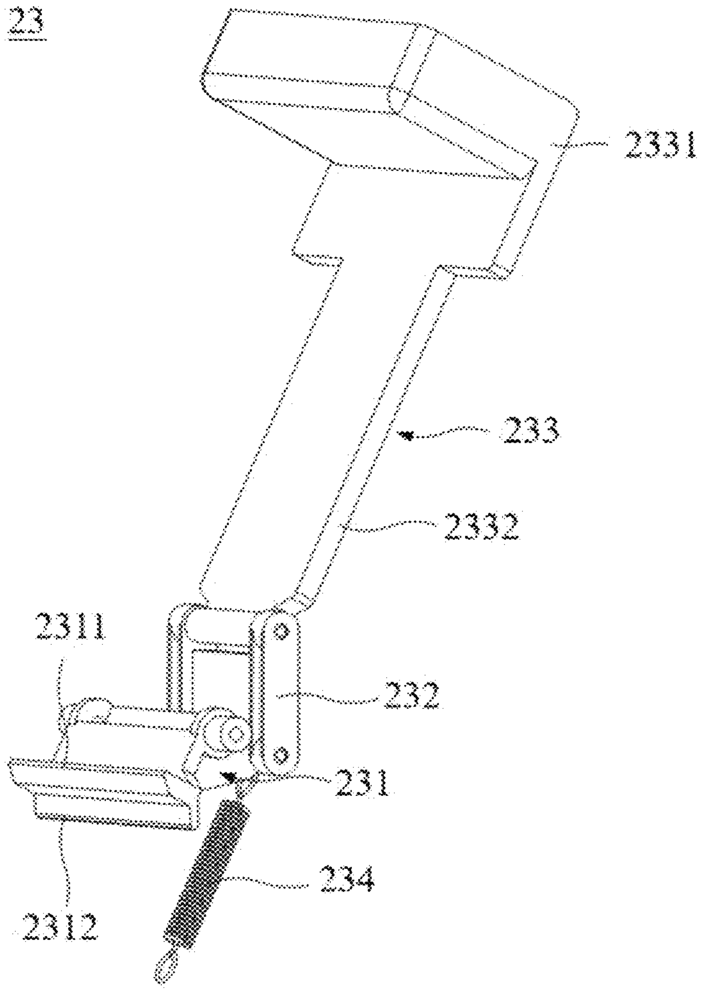
FIG. 25 is a structural diagram of an embodiment of a snap switch provided in this application.

Referring to FIGS. 17-18, in some embodiment, the litter device 100 can include a plurality of support legs 15 detachably connected under the base 10, the side of the base 10 facing away from the shell 30 can be provided with a plurality of support interfaces 12, and one end of the support leg 30 can be detachably connected into the support interface 12. When the litter device 100 is in use, the support legs 15 can be mounted on the base 10 to support the base 10 and the shell 30; when the litter device 100 is transported, the supporting lets 15 can be detached from the base 10 to reduce transportation costs.

The support leg 15 can include a mounting portion 151 connected in the support interface 12, and a support portion 152 connected to the end of the mounting portion 151 away from the shell 30. An elastic buckle 153 can be provided on the sidewall of the support portion 152, and a limit hole 13 is formed on the inner wall of the support interface 12. When the support leg 15 is assembled, the elastic buckle 153 can be squeezed by the inner wall of the support interface 12 and elastically deformed, so that the support leg 15 can be inserted into the support interface 21 conveniently. When the support leg 15 is installed on the base 10, the elastic buckle 153 can be partially accommodated in the limit hole 13, the limit hole 13 can constrain the movement of the elastic buckle 153 under the influence of the elastic force of the elastic buckle 153 to lock the support leg 15 in the support interface 12.

In one embodiment, a buckle mounting hole 154 can be opened on the sidewall of the mounting portion 151, and the elastic buckle 153 can be partially accommodated in the buckle mounting hole 154. The elastic buckle 153 can have a fixed end 1531 and a free end 1532 arranged oppositely, the fixed end 331 can be connected to the mounting portion 151, and the free end 1532 can be arranged at the end of the elastic buckle 153 away from the base 10, the free end 1532 can be exposed from the buckle mounting hole 154. When the support leg 15 is inserted into the support interface 12, the free end 1532 can be squeezed by the inner wall of the support interface 12, and flush with the outer wall of the mounting portion 151 to facilitate the installation of the support leg 15. When the support leg 15 is installed on the base 10, the free end 1532 can be contacted against wall of the limit hole 13 to limit the movement of the free end 1532, so that the support leg 15 can be locked in the support interface 12.

In one embodiment, a strip flange 155 can be provided on the sidewall of the mounting portion 151 and extended vertically. The strip flange 155 can be spaced apart from the elastic buckle 153, and the inner wall of the support interface 12 can be provided with a strip groove 123 correspondingly. The strip flange 155 can be received in the strip groove 123 when the support leg 15 is installed on the base 10.

In one embodiment, a limit step 156 can be provided at the connection between the mounting portion 151 and the support portion 152. When the support leg 15 is installed on the base 10, the limit step 36 can contact the base 10 to increase the contact area between the support leg 15 and the base 10.

In one embodiment, the support portion 152 can be inclined away from the outer periphery of the base 10, to enhance the stability of the litter device. The angle between the axis of the support arm 152 and the vertical direction can be 15 to 25 degrees. The cross-sectional area of the support portion 152 gradually decreases in the direction away from the base 10. The support portion 152 can be provided with a gasket 157 at the end away from the base 10, the gasket 157 can be configured to prevent slipping and absorb shock.

Referring to FIGS. 19-25, in some embodiment, the base 10 can be provided with a transmission interface 17 and a support interface 18, one side of the shell 30 can be pluggably connected with one end of the drive unit 70, and the other end of the drive unit 70 can be pluggably connected with the transmission interface 17. The opposite side of the shell 30 can be pluggably connected with one end of the support arm 20, and the other end of the support arm 20 can be pluggably connected to the support interface 18, so as to support the shell 30 on the base 10.

The shell 30 can include a main body 32, a transmission connection part 33 and a support connection part 34. The transmission connection part 33 and the support connection part 34 can be respectively connected to opposite sides of the main body 32. The transmission connection part 33 can be pluggably connected with one end of drive unit 70 facing the main body 32, and the support connection part 34 can be pluggably connected with one end of the support arm 20 facing the main body 32. The drive unit 70 and the support arm 20 can be pulled out from the shell 10 to achieve quick disassembly.

The cross-sectional shape of the transmission connection part 33 can be an elliptical, polygonal or other non-circular cross-section, for example, it can be a regular hexagon. The cross-sectional shape of the support connection part 34 can be circular to reduce the friction between the support connection part 34 and the support arm 20.

The support arm 20 can include a first housing 21, a second housing 22, a snap switch 23 and a decorative housing 24. The second housing 22 can be arranged around the side of the first housing 21 away from the drive unit 70, the second housing 22 and the first housing 21 can together form an installation cavity 25, the snap switch 23 can be partially accommodated in the installation cavity 25. The decorative housing 24 can be covered the outside of the second housing 22 and used to block the screw holes opened for connection between the second housing 22 and the first housing 21.

The first housing 21 can be provided with a support connection hole 211, and the support connection part 34 can be rotatably inserted into the support connection hole 211. A cover plate 213 can be provided on the side of the support connection hole 211 away from the shell. A first clamping portion 212 can be provided at one end of the first housing 21 close to the base 10, a second clamping portion 221 can be provided at one end of the second housing 22 close to the base 10. The first clamping portion 212 and the second clamping portion 221 can be enclosed to form a snap joint 26, and the snap joint 26 can be pluggably connected in the support interface 18.

The snap switch 23 can lock or unlock the snap joint 26 in the support interface 18. When the shell 30 is assembled on the base 10, the snap switch 23 can lock the snap joint 46 in the support interface 18 to prevent the shell 30 from shaking. When the shell 30 needs to be disassembled, the snap switch 23 can unlock the snap joint 26, so that the shell 30 can be quickly dismantled.

The snap switch 23 can include a snap element 231, a connecting element 232, a pressing element 233 and a reset element 234. The snap element 231, the connecting element 232 and the pressing element 233 can be sequentially rotatably connected in a direction away from the snap joint 26. The snap element 231 can be rotatably connected to the second housing 22, one end of the reset element 234 can be connected to the connection between the snap element 231 and the connecting element 232, and the other end of the reset element 234 can be connected to the second housing 22. When the support arm 20 is inserted into the support interface 18, the reset element 234 can pull the snap element 231 to rotate in the clockwise direction in FIG. 24, and the end of the snap element 231 away from the connector 232 can be partially exposed at the second clamping portion 221 to lock the snap joint 26.

The end of the pressing element 233 away from the connecting element 232 can be partially exposed to the second housing 22. When the support arm 20 is pulled out of the support interface 18, the end of the pressing element 233 away from the connecting element 232 can be pressed. The pressing element 233 can drive the snap element 231 to rotate in the counterclockwise direction in the figure through the connecting element 232, and make the end of the snap element 231 exposed on the second clamping portion 221 flush with the outer wall of the second clamping portion 221 to unlock the snap joint 26.

The snap element 231 can include a buckle part 2311 and a sealing part 2312. The buckle part 2311 and the sealing part 2312 can be connected at one end away from the connecting element 232. The base 10 can be provided with a snap hole 19, and the second housing 22 can be provided with a switch hole 222. The snap hole 19 can be provided on the side wall of the support interface 18. When the snap element 231 is driven to rotate clockwise, the buckle portion 2311 can pass through the switch hole 222 and be inserted into the snap hole 19, thereby restricting the buckle part 2311 in the snap hole 19 to the snap joint 26.

The sealing portion 2312 can be in contact with the inner wall of the second clamping portion 221 to seal the switch hole 222 to prevent objects from entering the installation cavity 25 through the gap of the switch hole 222.

The pressing element 233 can include a connected pressing portion 2331 and a transmission portion 2332. One end of the transmission portion 2332 can be connected to the connecting element 232. The second housing 22 can be provided with a pressing groove 223, and the connected pressing portion 2231 can be partially passed through sidewall of the pressing groove 223 and accommodated in the pressing groove 223, so that the pressing portion 2331 cannot be exposed outside the second housing 22.

When it is necessary to disassemble the shell 30, user can press the pressing portion 2331, and the transmission portion 2332 can drive the snap element 231 to rotate in the counterclockwise direction through the connection element 232. The pressing portion 2311 can be pull out from the latching hole 19, and the end of the pressing portion 2311 can be flush with the outer wall of the second clamping portion 221 to release the restriction of the snap joint 26 by the snap hole 19.

The second housing 22 can be provided with a limit plate 224 on the side of the pressing groove 223 away from the second clamping portion 221. When the pressing portion 2331 is pressed, the pressing part 2331 can contact the limit plate 224 to limit the stroke of the pressing portion 2331.

It can be understood that the above-mentioned plug-in and pull-out connection between the support arm 20 and the support interface 18 is also applicable to the plug-in and pull-out connection between the transmission arm 70 and the transmission interface 17, which will not be described again here. le. The end of 2311 is flush with the outer wall of the second clamping portion 221 to release the restriction of the clamping joint 26 by the snap hole 19.

The second housing 22 is provided with a limiting plate 224 on the side of the pressing groove 223 away from the second engaging portion 221. When the pressing part 2331 is pressed, the pressing part 2331 can contact the limiting plate 224 to limit the stroke of the pressing part 2331.

It can be understood that the above-mentioned connection between the support arm 20 and the support interface 18 can also be applicable to the connection between the drive unit 70 and the transmission interface 17, which will not be described again here.

The above embodiments further illustrate the contents of the present application, but should not be construed as limiting the present application. Without departing from the spirit and essence of the present application, modifications and substitutions made to the methods, steps or conditions of the present application all fall within the scope of the present application. Unless particularly specified, the technical means used in the embodiments are conventional means well known to those skilled in the art.

What is claimed is:

1. A litter device comprising:

a base having a concave groove;

at least one support arm arranged on the base;

a shell having a chamber and partially accommodated in the concave groove, the shell is rotatably connected to the support arm and rotated around an axis relatively to the support arm; and a container arranged under the chamber, and having a collection cavity configured for collecting waste;

wherein the chamber having an opening to allow pets to enter into, the shell is in shape of arc and having a center, the shell having an upper end and a lower end in the direction perpendicular to the axis, an angle between connection line of the upper end and the center and connection line of the lower end and the center is between 120-180 degrees;

wherein an angle between the connection line of the lower end and center and horizontal line when the shell is in an initial state is between 20-40 degrees.

2. The litter device of claim 1, wherein the angle is between 120-150 degrees.

3. The litter device of claim 1, wherein the litter device further comprises a baffle and a filter element, one end of the baffle is mounted on the shell, the filter element is connected to another end of the baffle, the chamber is divided into storage space and separation space by the baffle and the filter element; the end of the baffle connected to the filter element is extended from the end of baffle mounted on the shell in a direction away from inner wall of the shell.

4. The litter device of claim 1, wherein in the direction perpendicular to the opening of the shell, the ration between the area defined by the outline of the inner edge of the opening of the shell and the maximum area defined by the outer contour line of the shell 30 is greater than 0.9.

5. The litter device of claim 1, wherein the litter device further comprises a drive unit, the drive unit includes:

a mounting plate, mounted on the base and extended vertically away from the base;

a driving wheel, arranged at the end of the mounting plate close to the base;

a driven wheel, arranged at another end of the mounting plate away from the base, and connected to the shell;

a conveyor belt, connected the driving wheel and the driven wheel;

a motor, connected to the driving wheel and configured to drive the shell; and a tension adjustment member mounted on the mounting plate, which is configured for adjusting the tension of the conveyor belt.

6. The litter device of claim 5, wherein the tension adjustment member comprises an adjustment body, an adjustment shaft and a torsion spring, one end of the adjusting body is rotatably mounted on the mounting plate, the adjusting shaft is rotatably connected to another end of the adjusting body, the opposite ends of the torsion spring is respectively in contact with the mounting plate and the adjustment body.

7. The litter device of claim 1, wherein the container comprises a bottom housing and a side housing connected to the bottom housing, the side housing is made of foldable material, the side housing is processed from a first material, the bottom housing is processed from a second material, the hardness of the second material is greater than the hardness of the first material.

8. The litter device of claim 7, wherein the bottom housing comprises a bottom plate and a side part, the side part is arranged around the outer periphery of the bottom plate and connected to the side housing.

9. The litter device of claim 8, wherein the container further comprises:

a push-pull part arranged on one side of the side housing away from the bottom housing, and connected to the side housing; and a first frame arranged on outer side of the side housing adjacent to the push-pull part, one end of the first frame arranged on the outer side of the side housing and connected to the push-pull part, the other end of the first frame is transversely along the side housing;

wherein the first frame comprises a first frame wall and a first flange protruding from the first frame wall, the first flange is connected to the side of the first frame wall away from the side housing.

10. The litter device of claim 9 wherein the container further comprises a second frame on the side opposite the push-pull part and connected to the side housing; the second frame comprises a second frame wall and a second flange, the first frame wall and the second frame wall are connected as a whole to surround the side housing, the second flange is connected to the side of the second frame wall away from the side housing, wherein the distance between upper edge of the first frame wall and the second frame wall and upper edge of the side housing is greater than zero.

11. The litter device of claim 10, wherein the container further comprises a first hook arranged on the side of the second flange away from the bottom housing, the first hook and the second flange are rotatably connected through a torsion spring, wherein the first hook is configured for hanging a drawstring of garbage bag.

12. The litter device of claim 11, wherein the push-pull part includes a drawstring storage cavity configured for storing the drawstring of garbage bag, a second hook is arranged in the drawstring storage cavity and configured to hang the drawstring of garbage bag away from the first hook, a drawstring hole is arranged on the side wall of the drawstring storage cavity close to the first hook, the drawstring hole has an opening on the side away from the bottom housing, the drawstring can be passed through the opening, entered into the drawstring hole and hung on the second hook.

13. The litter device of claim 1, wherein the litter device further comprises a plurality of support legs detachably connected under the base, the base away from the shell includes a plurality of support interfaces, one end of one support leg is detachably connected in one support interface; the support leg includes:

a mounting portion connected into the support interface;

a support portion connected to the end of the mounting portion away from the shell; and an elastic buckle arranged on sidewall of the support portion;

wherein a limit hole is formed on the inner wall of the support interface, the elastic buckle is partially accommodated in the limit hole.

14. The litter device of claim 13, wherein a buckle mounting hole is opened on the sidewall of the mounting portion, and the elastic buckle is partially accommodated in the buckle mounting hole, the elastic buckle has a fixed end and a free end arranged oppositely, wherein the fixed end is connected to the mounting portion, the free end is arranged at the end of the elastic buckle away from the base, the free end is exposed from the buckle mounting hole.

15. The litter device of claim 13, wherein a strip flange is arranged on the sidewall of the mounting portion, the inner wall of the support interface is provided with a strip groove, the strip flange is received in the strip groove when the support leg is installed on the base.

16. The litter device of claim 1, wherein the base includes a support interface, the shell includes an support connection part, the support arm is pluggably connected with the shell and the support interface respectively, wherein the support arm includes:

a first housing connected to the shell;

a second housing arranged around the side of the first housing away from the shell, the second housing and the first housing together form an installation cavity;

a snap switch partially accommodated in the installation cavity; and a decorative housing covered the outside of the second housing, and configured to block screw holes opened for connection between the second housing and the first housing;

wherein the first housing includes a support connection hole, the support connection part is rotatably inserted into the support connection hole; a cover plate is provided on the side of the support connection hole away from the shell, a first clamping portion is provided at one end of the first housing close to the base, a second clamping portion is provided at one end of the second housing close to the base, the first clamping portion and the second clamping portion are enclosed to form a snap joint pluggably connected in the support interface;

wherein the snap switch can lock or unlock the snap joint in the support interface.

17. The litter device of claim 16, wherein the snap switch includes:

a snap element, rotatably connected to the second housing;

a connecting element, rotatably connected to the snap element;

a pressing element, rotatably connected to the connecting element; and a reset element having an end connected to the connection between the snap element and the connecting element;

wherein the other end of the reset part is connected to the second housing, the reset element can pull the snap element to rotate when the support arm is inserted into the support interface, and the end of the snap element away from the connector is partially exposed at the second clamping portion to lock the snap joint;

the end of the pressing element away from the connecting element is partially exposed to the second housing, the pressing element can drive the snap element to rotate through the connecting element when the support arm is pulled out of the support interface, and the end of the snap element exposed on the second clamping portion can flush with the outer wall of the second clamping portion to unlock the snap joint.

18. A litter device comprising:

a base having a concave groove;

at least one support arm arranged on the base;

a shell having a chamber and partially accommodated in the concave groove, the shell is rotatably connected to the support arm and rotated around an axis relatively to the support arm, the chamber having an opening to allow pets to enter into; and a container arranged under the chamber, and having a collection cavity configured for collecting waste;

wherein in the direction perpendicular to the opening of the shell, the ration between the area defined by the outline of the inner edge of the opening of the shell and the maximum area defined by the outer contour line of the shell 30 is greater than 0.9.

19. A litter device comprising:

a base having a concave groove;

at least one support arm arranged on the base;

a shell having a chamber and partially accommodated in the concave groove, the shell is rotatably connected to the support arm and rotated around an axis relatively to the support arm, the chamber having an opening to allow pets to enter into;

a container arranged under the chamber, and having a collection cavity configured for collecting waste; and the litter device further comprises a baffle and a filter element, one end of the baffle is mounted on the shell, the filter element is connected to another end of the baffle, the chamber is divided into storage space and separation space by the baffle and the filter element; the end of the baffle connected to the filter element is extended from the end of baffle mounted on the shell in a direction away from inner wall of the shell;

wherein an angle between the connection line of the lower end and center and horizontal line when the shell is in an initial state is between 20-40 degrees.

* * * * *